(12) United States Patent
Pettibone et al.

(10) Patent No.: US 10,739,276 B2
(45) Date of Patent: Aug. 11, 2020

(54) MINIMIZING FILED SIZE TO REDUCE UNWANTED STRAY LIGHT

(71) Applicant: KLA-Tencor Corporation, Milpitas, CA (US)

(72) Inventors: Donald Pettibone, San Jose, CA (US); Daniel Ivanov Kavaldjiev, San Jose, CA (US); Chuanyong Huang, San Jose, CA (US); Qing Li, San Jose, CA (US); Frank Li, Danville, CA (US); Zhiwei Xu, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 119 days.

(21) Appl. No.: 15/828,938

(22) Filed: Dec. 1, 2017

(65) Prior Publication Data

US 2019/0137411 A1    May 9, 2019

Related U.S. Application Data

(60) Provisional application No. 62/581,455, filed on Nov. 3, 2017.

(51) Int. Cl.
*G01N 21/95*    (2006.01)
*G01J 1/02*    (2006.01)
(Continued)

(52) U.S. Cl.
CPC ........ *G01N 21/9501* (2013.01); *G01J 1/0214* (2013.01); *G01J 1/0219* (2013.01);
(Continued)

(58) Field of Classification Search
CPC .......... G01N 21/9501; G01N 2201/064; G01J 1/0214
See application file for complete search history.

(56) References Cited

U.S. PATENT DOCUMENTS 6,400,454 B1 *  6/2002  Noguchi ............ G01N 21/9501
                                                356/237.3
6,411,377 B1 *  6/2002  Noguchi ................ B82Y 15/00
                                                356/237.4
(Continued)

FOREIGN PATENT DOCUMENTS

DE    102006011191 A1    10/2006
JP       H11337889 A    12/1999
(Continued)

OTHER PUBLICATIONS

Gauvin et al., Reducing stray light in Opto-Mechanical Systems, Lambda Research Corporation, pp. 1-4.
(Continued)

*Primary Examiner* — David P Porta
*Assistant Examiner* — Djura Malevic
(74) *Attorney, Agent, or Firm* — Hodgson Russ LLP

(57) ABSTRACT

Stray and air scattered light can be reduced by configuring a size of the collection area of a sensor, which reduces a source of sensitivity-limiting noise in the system. By adjusting a size of the collection area, stray deep ultraviolet light and air-scattered deep ultraviolet light can be reduced. A servo can control a position of an illumination spot that is collected by the time delay and integration sensor.

20 Claims, 6 Drawing Sheets

(51) Int. Cl.
*G01J 1/04* (2006.01)
*G01J 1/42* (2006.01)

(52) U.S. Cl.
CPC ........... *G01J 1/0266* (2013.01); *G01J 1/0437* (2013.01); *G01J 1/429* (2013.01); *G01J 1/4228* (2013.01); *G01N 2201/064* (2013.01)

(56) References Cited

U.S. PATENT DOCUMENTS

| | | | |
|---|---|---|---|
| 6,724,473 B2 * | 4/2004 | Leong | G01N 21/47 356/237.2 |
| 7,110,106 B2 | 9/2006 | Xu et al. | |
| 7,436,503 B1 * | 10/2008 | Chen | G01N 21/9501 250/550 |
| 7,525,649 B1 * | 4/2009 | Leong | G01N 21/8806 356/237.1 |
| 7,826,049 B2 * | 11/2010 | Furman | G01N 21/9501 356/237.4 |
| 7,843,558 B2 * | 11/2010 | Furman | G01N 21/8806 356/237.1 |
| 7,952,700 B2 * | 5/2011 | Hamamatsu | G01N 21/956 356/237.2 |
| 7,973,921 B2 * | 7/2011 | Silberstein | G01N 21/9501 356/237.3 |
| 8,135,207 B2 * | 3/2012 | Silberstein | G01N 21/9501 356/237.2 |
| 9,165,443 B2 * | 10/2015 | Bachels | G08B 13/193 |
| 9,291,575 B2 * | 3/2016 | Zhao | G01N 21/9501 |
| 9,335,211 B2 * | 5/2016 | Vasic | G01N 21/6408 |
| 10,122,847 B2 * | 11/2018 | Alameh | H04M 3/02 |
| 2003/0030794 A1 | 2/2003 | Watkins et al. | |
| 2003/0030804 A1 * | 2/2003 | Nordman | G01N 27/44721 356/344 |
| 2003/0223058 A1 * | 12/2003 | Leong | G01N 21/47 356/237.2 |
| 2005/0030534 A1 * | 2/2005 | Oldham | B82Y 10/00 356/344 |
| 2005/0036142 A1 * | 2/2005 | Oldham | B82Y 20/00 356/344 |
| 2006/0103725 A1 * | 5/2006 | Brown | H04N 5/37206 348/92 |
| 2007/0064135 A1 * | 3/2007 | Brown | H04N 5/3765 348/311 |
| 2007/0229833 A1 | 10/2007 | Rosencwaig et al. | |
| 2008/0008076 A1 * | 1/2008 | Raguin | G11B 7/0065 369/103 |
| 2008/0079830 A1 * | 4/2008 | Lepage | H04N 5/3743 348/295 |
| 2010/0208978 A1 * | 8/2010 | Terasawa | B82Y 10/00 382/145 |
| 2013/0016346 A1 * | 1/2013 | Romanovsky | G01N 21/9501 356/237.5 |
| 2014/0300890 A1 | 10/2014 | Lange et al. | |
| 2014/0368797 A1 | 12/2014 | Ferri et al. | |
| 2015/0003061 A1 | 1/2015 | Brukilacchio | |
| 2015/0144798 A1 | 5/2015 | Shi et al. | |
| 2015/0370175 A1 | 12/2015 | Nicolaides et al. | |
| 2016/0097727 A1 * | 4/2016 | Vazhaeparambil | G01N 21/8851 382/145 |
| 2016/0180517 A1 | 6/2016 | Fuchs et al. | |
| 2016/0276129 A1 * | 9/2016 | Stevens | G03F 7/20 |
| 2016/0334516 A1 | 11/2016 | Jiang et al. | |
| 2017/0025247 A1 * | 1/2017 | Stevens | H01J 37/222 |

FOREIGN PATENT DOCUMENTS

| | | |
|---|---|---|
| JP | 6193608 B2 | 9/2017 |
| WO | 2014140256 A2 | 9/2014 |

OTHER PUBLICATIONS

Folded path LWIR system for SWAP constrained platforms, Infrared Technology and Applications XL, SPIE vol. 9070, 2014, pp. 23.
ISA/KR, International Search Report for PCT/US2018/058814 dated Feb. 22, 2019.

* cited by examiner

MINIMIZING FILED SIZE TO REDUCE UNWANTED STRAY LIGHT

CROSS-REFERENCE TO RELATED APPLICATIONS

This application claims priority to the provisional patent application filed Nov. 3, 2017 and assigned U.S. Application Ser. No. 62/581,455, the disclosure of which is hereby incorporated by reference.

FIELD OF THE DISCLOSURE

This disclosure relates to improved imaging.

BACKGROUND OF THE DISCLOSURE

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection is used to find defects in semiconductor devices on a wafer as well as defects on blank, unpatterned wafers. False positives, or false counts, are undesirable in any inspection situation. False counts in an inspection system can arise from multiple sources. This may include electronic noise associated with detectors in the system as well as external noise associated with photons or radiative particles from sources other than the sample of interest. In the context of inspection systems, a false count occurs when a signal not associated with a sample is detected by one or more detectors and is incorrectly associated with properties of the sample.

Unwanted radiation gives signal from a time delay and integration (TDI) sensor over an entire area that has vertical clocking voltages applied to it. This is the region where the collected photocharge makes up a moving photoelectron image that is synced with the optical image as a wafer is scanned. Both stray light and air scattered deep ultraviolet (DUV) light have a broader footprint in the image plane than the illumination profile that provides the desired signal from defects on the wafer. Illuminated air above the wafer plane, such as at distances from 50-200 μm, can cause scattering. Air scattered light and scattered stray light tend to originate in planes far from the image plane in the z direction, which is at right angles to the imaging plane. Such points are not brought to a focus in the imaging plane so they tend to be spread out.

Therefore, a technique to reduce unwanted stray and air scattered light is needed.

BRIEF SUMMARY OF THE DISCLOSURE

In a first embodiment, a system is provided. The system includes a time delay and integration sensor and a servo. The time delay and integration sensor has a collection area that includes a plurality of zones. Only a fraction of the zones are activated, and a waveform is not applied to a remainder of the zones. The servo controls a position of an illumination spot. Light in the illumination spot is collected by the time delay and integration sensor. The time delay and integration sensor may be a charge-coupled device. The servo may be a beam steering and shaping module servo.

The system can further include a calibration system in electronic communication with the servo. The calibration system can provide automatic calibration of a positon of the servo.

The system can further include a dark field light source that provides the illumination spot.

The collection area may be 83 microns or less in width. The collection area may be from 64 pixels to 128 pixels or from 40 pixels to 128 pixels.

The air-scattered deep ultraviolet light may be reduced to below 1.1 ppb.

The time delay and integration sensor and the servo may be part of an inspection system. The inspection system may include a chuck configured to hold a wafer.

In a second embodiment, a method is provided. The method includes imaging a wafer using a time delay and integration sensor having a collection area. The collection area includes a plurality of zones. Only a first fraction of the zones are activated. A waveform is not applied to a remainder of the zones.

The method can include positioning an illumination spot collected by the time delay and integration sensor using a servo.

The collection area may be 83 microns or less in width. The collection area may be from 64 pixels to 128 pixels or from 40 pixels to 128 pixels.

The air-scattered deep ultraviolet light may be reduced to below 1.1 ppb.

The imaging can include dark field illumination.

In a third embodiment, a system is provided. The system includes a time delay and integration sensor having a collection area with a plurality of zones and a servo that controls a position of an illumination spot. At least a part of the time delay and integration sensor is obscured such that only a first fraction of the zones receive light. Light in the illumination spot is collected by the time delay and integration sensor. The servo may be a beam steering and shaping module servo.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Figure 1:
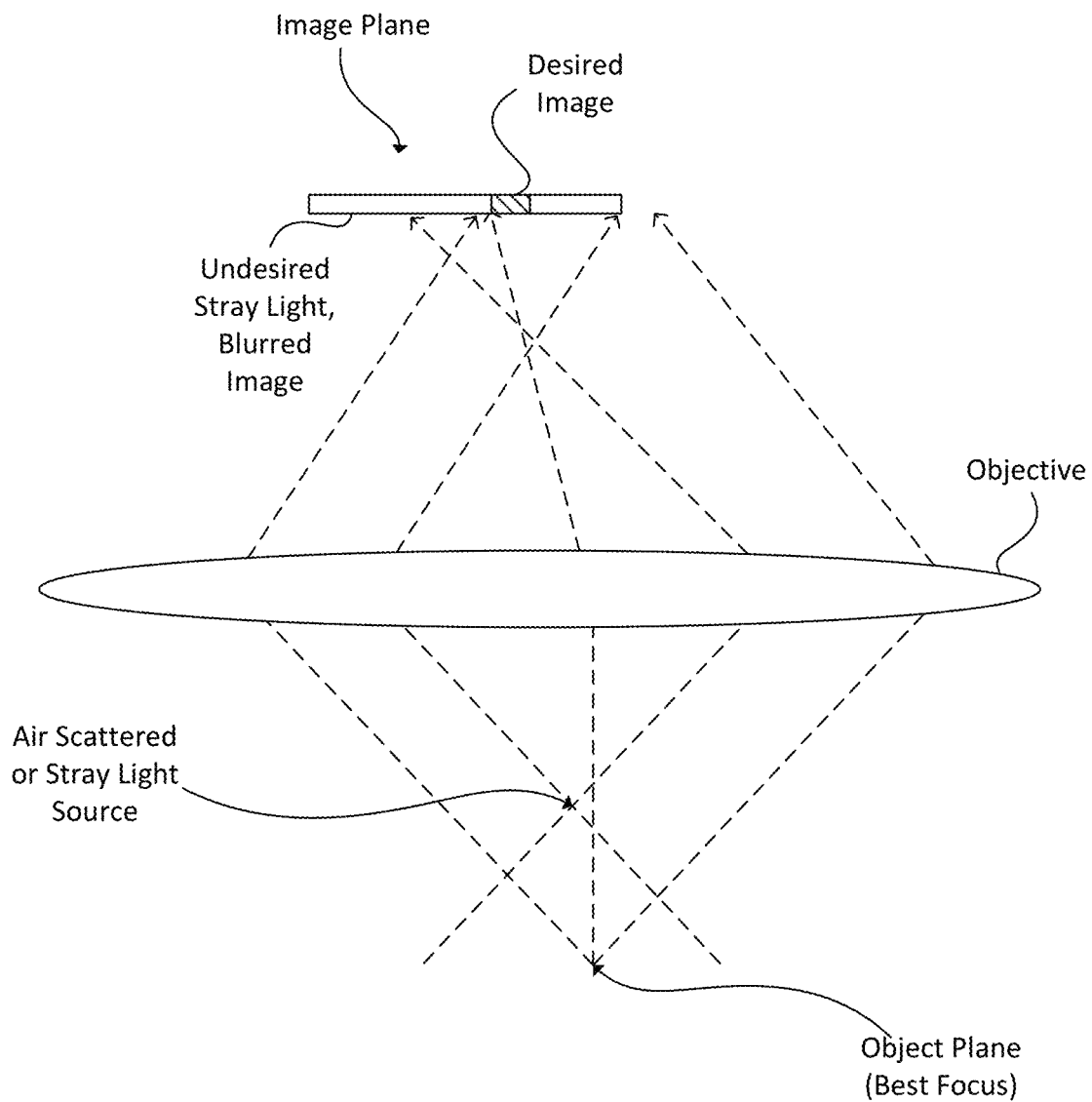
FIG. 1 is a schematic ray trace showing how stray or scattered light originating in planes away from the object plane give a large, blurred image in the image sensor plane.

Stray and air scattered light can be reduced by a factor on the order of approximately two to four by configuring a size of the collection area. The reduction ratio is how much light is obtained from the stray light with the wider TDI collection area compared to the narrower TDI collection area. This also reduces the amount of collected high energy radiation from muons and X-rays. This radiation does not contribute to the stray and air scattered DUV light, but does appear as undesirable false defects. By reducing the stray and scattered DUV light, as seen in FIG. 1, a source of sensitivity-limiting noise in the system can be reduced. Any reduction of noise is beneficial in terms of overall system sensitivity at speed, which is an important specification to semiconductor manufacturers. The embodiments disclosed herein can be applied to patterned or unpatterned inspection of wafer.

It was not previously known that stray light could be reduced using a narrower TDI collection area. Instead, large margins in the image plane were used for drift of the TDI illumination spot. Illumination and collection can be designed to account for this. A servo loop can periodically and automatically realign an illumination patch to reduce a drift margin.

Figure 2:
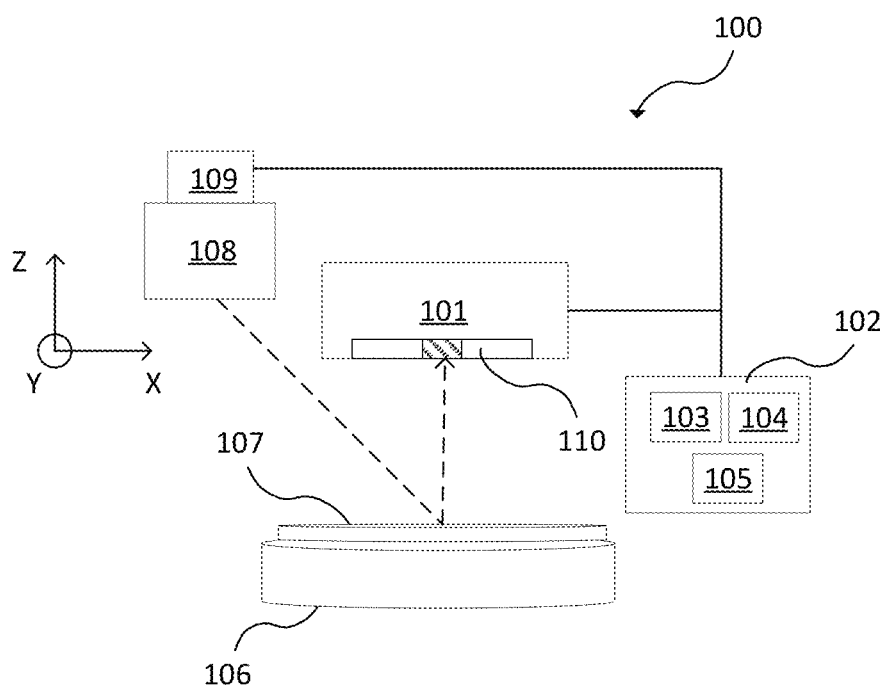
FIG. 2 is a block diagram of a system in accordance with the present disclosure.

FIG. 2 is a block diagram of an embodiment of a system 100. The system 100 includes a chuck 106 configured to hold a wafer 107 or other workpiece. The chuck 106 may be configured to move or rotate in one, two, or three axes. The chuck 106 also may be configured to spin, such as around the Z-axis.

The system 100 also includes a sensor 101 that receives light from a surface of the wafer 107. The sensor 101 may be, for example, a time delay and integration (TDI) sensor having a collection area 110. The TDI sensor may be a charge-coupled device (CCD).

The collection area 110 of the sensor 101 can be configured such that stray deep ultraviolet light and air-scattered deep ultraviolet light can be reduced. For the case of air scatter, the unwanted stray light can be reduced by 44% by going from 256 pixels wide to 128 pixels wide. Specifically, that can be a drop from 1.8 ppb of air scatter to 1.1 ppb due to air scatter over this collection area. As wafers have less and less scatter due to reduced wafer roughness, the air scatter becomes significant and ways to reduce it are beneficial in terms of improved sensitivity.

For the case of forward scattered light, the unwanted stray light can be reduced by 46% by going from 256 pixels wide to 128 pixels wide. This can be a drop from 26 ppb to 14 ppb over the collection area. For example, with a wafer roughness of 30 ppb, the air scattered light at 256 pixels wide is almost the same as the wafer scatter, which is unavoidable. Reducing unwanted stray light almost 2× is beneficial in terms of being able to detect smaller defects.

Changing the illumination optics may narrow the active region even further and reduce both of these sources by a factor proportional to the width ratio change. This could be another factor of two reduction or more. The area of the collection area 110 can be changed or reduced to particular dimensions, such as the area with hatching within the collection area 110 of FIG. 2. While illustrated in the center of the sensor 101, the collection area 110 may be positioned at an edge.

A light source 108, which may be a dark field light source, can provide an illumination spot on the wafer 107 that is collected by the sensor 101 represented by the dashed line. A servo 109 can control a position of the illumination spot. The servo 109 may be, for example, a beam steering and shaping module (BSS) servo. Such a servo may be part of a system that manipulates a beam of radiation or another particle beam. The servo part refers to a feedback system where periodically the beam position is measured on the TDI sensor and adjustments are made to the optical elements that make up the BSS to center the illumination spot on the desired part of the TDI. This can be the center of the open mask area or the center of the electrically active portion of the TDI. In an instance, the servo 109 can periodically and automatically realign an illumination patch to reduce a drift margin. This can ensure that the illumination is collected by an active region of the sensor 101.

The servo 109 can control the position of the illumination spot and can be used to accurately control for drift of the spot, which tends to happen over time periods of approximately a day or more. A feedback loop may be used to correct the position. For example, by taking framemode images of the illumination spot on a wafer or on a calibration chip, drifts of the illumination spot position can be tracked and corrected.

In an instance, the collection area 110 is 83 microns or less in width (e.g., the x direction or the y direction). The collection area 110 may be from 64 pixels to 128 pixels or from 40 pixels to 128 pixels. A collection area 110 of 32 pixels in dimension or even 16 pixels in dimension is possible.

By adjusting the collection area 110, the stray deep ultraviolet light and the air-scattered deep ultraviolet light can be reduced.

The collection area 110 can be configured using various techniques to reduce air scattered and stray light. In an instance, an optical mask is added at or in the sensor 101 to cut out the unwanted regions and leaves only the illuminated light region. This may not reduce the muon and X-ray induced photoelectrons, but does block stray and air scattered light.

In an instance, the optical mask can be a metal foil with a cutout aligned with the desired active area of the TDI sensor. In another instance, this could be a metal deposition on the glass cover plate that protects the TDI. The metal deposition would mask out the undesired areas on the TDI.

In another instance, the unwanted areas of the sensor 101 are obscured by not collecting photocharge from regions outside the illuminated region. For example, parts of the sensor 101 may be inactivated. In a particular example, the collection area 110 can be changed for different applications, which provides flexibility. In an example using darkfield defect detection, narrow illumination is used and the effective width of the TDI is minimized. Those are three of the four channels that are imaged. The fourth channel may be a brightfield channel where the stray light is not an issue because the brightfield light would swamp the stray light.

Figure 6:
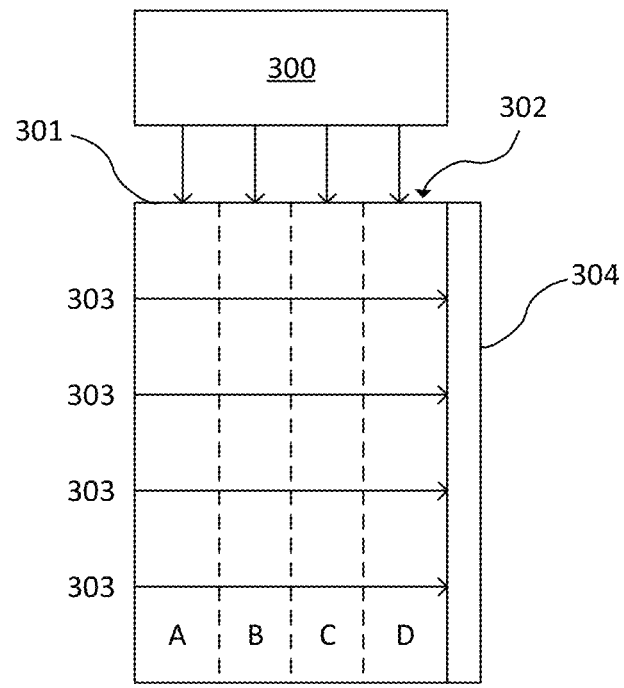
FIG. 6 is an example of a TDI sensor in accordance with the present disclosure.

The collection area 110 of the sensor 101 can be changed using clocking circuitry, which can provide zone control of the sensor 101. This is further illustrated in FIG. 6. The effective width of the TDI sensor 301, which can be part of the sensor 101, can be controlled through zone switching of the vertical clocking waveforms.

The TDI sensor 301 includes one or more TDI readout registers 304. The TDI integration and clocking direction is illustrated by the arrows 303. Image sweeping in this example sweeps from left to right. Electrical switches 302 can be used for each of the zones A-D. The TDI sensor 301 works with the TDI vertical clocking waveform generator 300 that can generate voltages to cause the sweeping.

Zones A-D are switched on to activate the entire TDI sensor width. For half of the TDI sensor, then only two zones may be activated, such as C and D. In this example, no waveform is applied to A and B. For one fourth of the TDI sensor, then only one zone may be switched on, such as D. The activated zones may be proximate the TDI readout registers 304.

The electrical switching of zones A-D of the TDI sensor 301 can reduce the effective TDI sensor width and can both reduce stray scattered light and block out high energy particles. Lowering the outliers from high energy particles also can be beneficial because these can give rise to false defects.

There was no previous effort to make the illumination field of view as narrow as possible. By reducing the stray and scattered light, such as DUV light, a source of noise that limits sensitivity can be reduced. This improves overall system sensitivity at speed.

Turning back to FIG. 2, the system 100 that the sensor 101 and the servo 109 are part of is an inspection system. The spot can be periodically imaged in framemode to detect spot shifts. Then any shift can be corrected using the servo 109.

The system 100 communicates with a controller 102. For example, the controller 102 can communicate with the sensor 101, the servo 109, and/or other components of the system 100. The controller 102 can include a processor 103, an electronic data storage unit 104 in electronic communication with the processor 103, and a communication port 105 in electronic communication with the processor 103. It is to be appreciated that the controller 102 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 102 to implement various methods and functions may be stored in controller readable storage media, such as a memory in the electronic data storage unit 104, within the controller 102, external to the controller 102, or combinations thereof.

The controller 102 is illustrated in electronic communication with the sensor 101 and the servo 109 such that the controller 102 can receive information to generate images of the wafer 107 and provide automatic calibration of a positon of the servo 109. Two controllers 102 can be used to handle these functions separately.

The controller 102 can include one or more processors 103 and one or more electronic data storage units 104. Each processor 103 may be in electronic communication with one or more of the electronic data storage units 104. In an embodiment, the one or more processors 103 are communicatively coupled. In this regard, the one or more processors 103 may receive readings received at the sensor 101 and store the reading in the electronic data storage unit 104 of the controller 102. The controller 102 may be part of the system itself or may be separate from the system (e.g., a standalone control unit or in a centralized quality control unit).

The controller 102 may be coupled to the components of the system 100 in any suitable manner (e.g., via one or more transmission media, which may include wired and/or wireless transmission media) such that the controller 102 can receive the output generated by the system 100, such as output from the sensor 101. The controller 102 may be configured to perform a number of functions using the output. For instance, the controller 102 may be configured to perform an inspection of the wafer 107. In another example, the controller 102 may be configured to send the output to an electronic data storage unit 104 or another storage medium without reviewing the output. The controller 102 may be further configured as described herein.

The controller 102, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The controller 102 may be in electronic communication with the sensor 101 or other components of the system 100. The controller 102 may be configured according to any of the embodiments described herein. The controller 102 also may be configured to perform other functions or additional steps using the output of the sensor 101 or using images or data from other sources.

An additional embodiment relates to a non-transitory computer-readable medium storing program instructions executable on a controller for performing a computer-implemented method that positions an illumination spot, as disclosed herein. In particular, as shown in FIG. 2, the controller 102 can include a memory in the electronic data storage unit 104 or other electronic data storage medium with non-transitory computer-readable medium that includes program instructions executable on the controller 102. The computer-implemented method may include any step(s) of any method(s) described herein. For example, the controller 102 may be programmed to perform some or all of the steps of FIG. 5. The memory in the electronic data storage unit 104 or other electronic data storage medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), SSE (Streaming SIMD Extension), or other technologies or methodologies, as desired.

In another embodiment, the controller 102 may be communicatively coupled to any of the various components or sub-systems of system 100 in any manner known in the art. Moreover, the controller 102 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the controller 102 and other subsystems of the system 100 or systems external to system 100.

In some embodiments, various steps, functions, and/or operations of system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape and the like. A carrier medium may include a transmission medium such as a wire, cable, or wireless transmission link. For instance, the various steps described throughout the present disclosure may be carried out by a single controller 102 (or computer system) or, alternatively, multiple controllers 102 (or multiple computer systems). Moreover, different sub-systems of the system 100 may include one or more computing or logic systems. Therefore, the above description should not be interpreted as a limitation on the present disclosure but merely an illustration.

Figure 3:
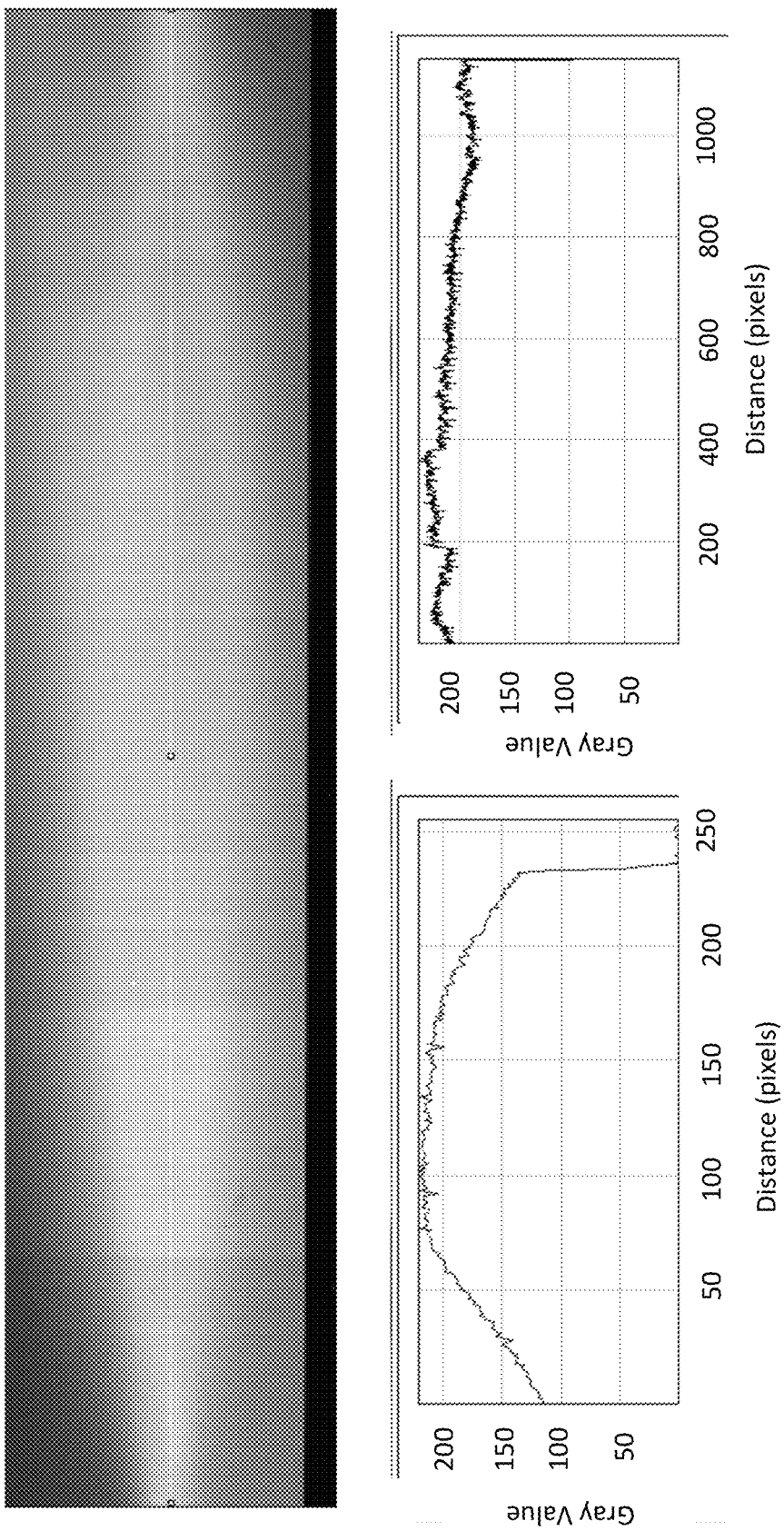
FIG. 3 is an air scatter image and profiles.

FIG. 3 is an air scatter image and profiles. The image does not include a wafer or stage. The image on the top is 256 pixels in height. The white haze in the center of the image is scatter from the air. The results show 1.8 ppb at 256 pixels wide and 1.1 ppb at 128 pixels wide. Results using a different technique shows 15.6 ppb at 256 pixels wide and 11 ppb at 128 pixels wide. If a source is far from the source plane, it will make a very large blurred image in the image plane. Ordinarily, blocking out the blurred part of an image when the image is made with a conventional camera would mean blocking out some of the desired content or features of the image. A TDI image with narrow illumination is different in that only a relatively narrow strip of what is imaged at any moment is lit. If there are blurred areas in the region outside of the illumination, these can be blocked out and the stray scattered light can be reduced.

Figure 4:
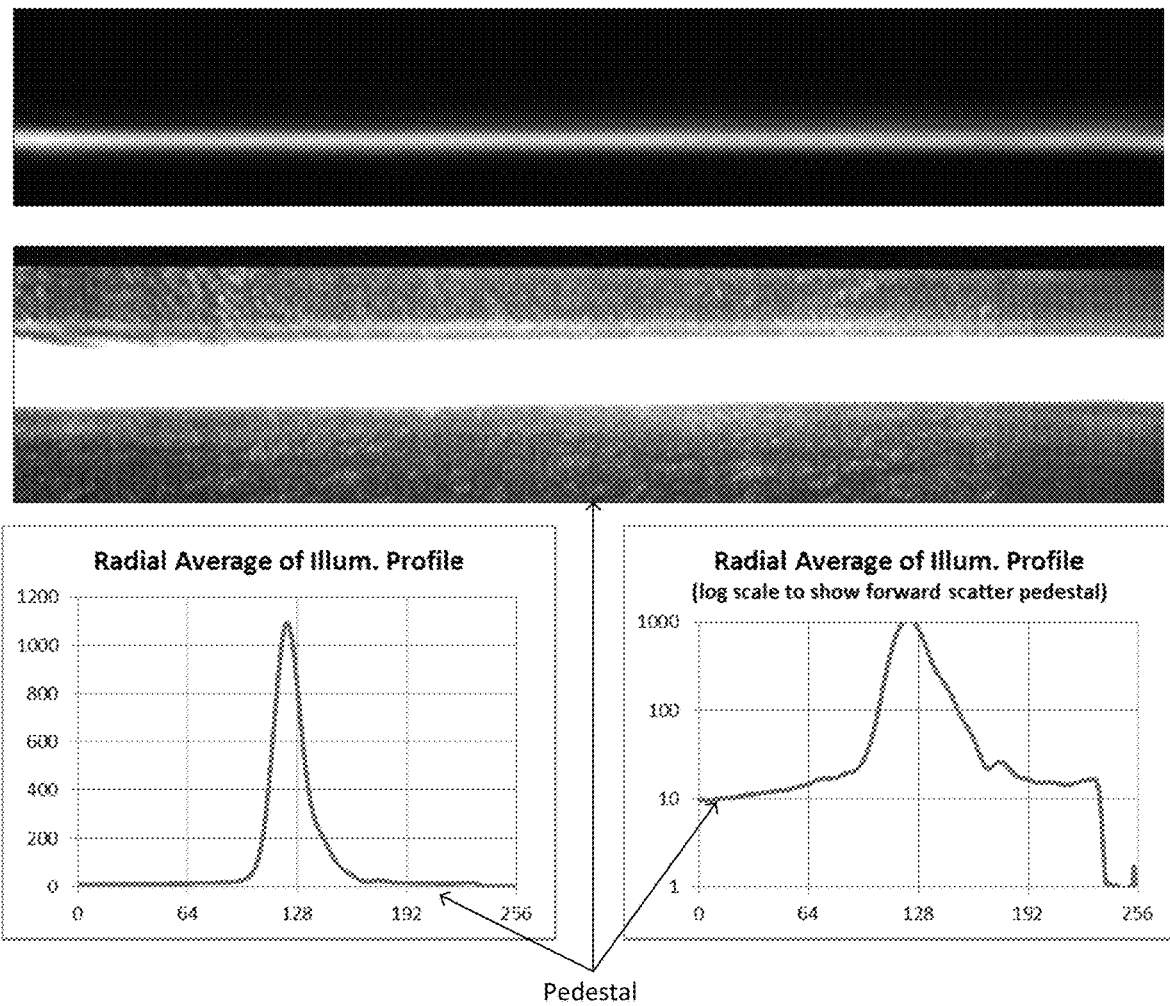
FIG. 4 illustrates forward stray light images of standard haze profile, wherein the top image is normal contrast and the bottom image is windowed up to show a forward scatter pedestal.

FIG. 4 illustrate forward stray light images of standard haze profile. The top image is normal contrast, the bottom image is windowed up to show a forward scatter pedestal. The radial averaged values show the forward stray light from the pedestal as well. Results show 200 ppb for a standard haze wafer, which forward stray light at 25.9 ppb at 256 pixels wide and 14.1 ppb at 128 pixels wide.

In FIG. 4, the top image shows a central white strip, which is the illumination light scattered off the wafer. Signal in the center is haze off the wafer. The bottom image in FIG. 4 is a zoomed in version of the top image with high grain. On either side of the illumination light the stray scattered light from air or off the optics is still visible.

The right graph of the illumination profile on the bottom of FIG. 4 is a zoomed-in version of the left graph with a log scale. The left chart is left to right across the entire top image.

In an example, an inspection system started with a 512 wide TDI sensor split into two sections, each 256 wide. Thus, the starting TDI sensors were effectively 256 pixels wide (166 µm wide at the wafer plane), while the illumination region was 60 pixels wide (39 µm at the wafer plane). Reducing the TDI sensor width reduced the unwanted high energy radiation. An active TDI width of 128 pixels, or 83 µm, was planned. However, it was determined that the stray and air scattered DUV light was fairly flat spatially across the full 256 pixel width. Therefore, a further reduction in width below between 128 pixels and 64 pixels was planned.

The features and results of FIGS. 3 and 4 are exemplary, and are not meant to be limiting.

Figure 5:
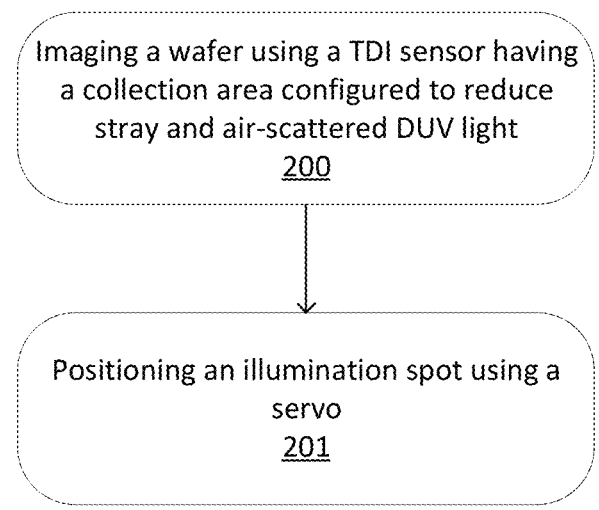
FIG. 5 is a flowchart of an embodiment in accordance with the present disclosure.

FIG. 5 is a flowchart of an embodiment. At 200, a wafer is imaged using a time delay and integration sensor having a collection area. The collection area is configured such that stray deep ultraviolet light and air-scattered deep ultraviolet light are reduced. The imaging may include dark field illumination. To obtain the collection area, some parts of the collection area may be obscured. At 201, an illumination spot collected by the time delay and integration sensor is optionally positioned using a servo.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Other types of wafers also may be used. For example, the wafer may be used to manufacture LEDs, solar cells, magnetic discs, flat panels, or polished plates. Defects on other objects also may be classified using techniques and systems disclosed herein.

Each of the steps of the method may be performed as described herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a time delay and integration sensor having a collection area, wherein the collection area includes a plurality of zones, wherein only a fraction of the zones are activated, and wherein a waveform is not applied to a remainder of the zones;
a servo that controls a position of an illumination spot, wherein light in the illumination spot is collected by the time delay and integration sensor; and
wherein the time delay and integration sensor is configured to adjust the collection area using an optical mask comprising a metal deposition on a glass plate disposed on the time delay and integration sensor such that the waveform is not applied to the remainder of the zones, selective collection of photocharge, or a clock circuit, whereby the adjusting reduces stray and air-scattered deep ultraviolet light.

2. The system of claim 1, wherein the time delay and integration sensor is a charge-coupled device.

3. The system of claim 1, wherein the servo is a beam steering and shaping module servo.

4. The system of claim 1, further comprising a calibration system in electronic communication with the servo, wherein the calibration system provides automatic calibration of a position of the servo.

5. The system of claim 1, further comprising a dark field light source that provides the illumination spot.

6. The system of claim 1, wherein the collection area is 83 microns or less in width.

7. The system of claim 6, wherein the collection area is from 64 pixels to 128 pixels.

8. The system of claim 6, wherein the collection area is from 40 pixels to 128 pixels.

9. The system of claim 1, wherein the air-scattered deep ultraviolet light is reduced to below 1.1 ppb.

10. The system of claim 1, wherein the time delay and integration sensor and the servo are part of an inspection system.

11. The system of claim 10, wherein the inspection system includes a chuck configured to hold a wafer.

12. A method comprising:
imaging a wafer using a time delay and integration sensor having a collection area, wherein the collection area includes a plurality of zones, wherein only a fraction of the zones are activated, and wherein a waveform is not applied to a remainder of the zones; and
adjusting the collection area using an optical mask comprising a metal deposition on a glass plate disposed on the time delay and integration sensor such that the waveform is not applied to the remainder of the zones, selective collection of photocharge, or a clock circuit, whereby the adjusting reduces stray and air-scattered deep ultraviolet light.

13. The method of claim 12, further comprising positioning an illumination spot collected by the time delay and integration sensor using a servo.

14. The method of claim 12, wherein the collection area is 83 microns or less in width.

15. The method of claim 14, wherein the collection area is from 64 pixels to 128 pixels.

16. The method of claim 14, wherein the collection area is from 40 pixels to 128 pixels.

17. The method of claim 12, wherein the air-scattered deep ultraviolet light is reduced to below 1.1 ppb.

18. The method of claim 12, wherein the imaging includes dark field illumination.

19. A system comprising:
a time delay and integration sensor having a collection area with a plurality of zones, wherein at least a part of the time delay and integration sensor is obscured such that only a first fraction of the zones receive light; and
a servo that controls a position of an illumination spot, wherein light in the illumination spot is collected by the time delay and integration sensor; and
wherein the time delay and integration sensor is configured to adjust the collection area using an optical mask comprising a metal deposition on a glass plate disposed on the time delay and integration sensor such that the waveform is not applied to the remainder of the zones, selective collection of photocharge, or a clock circuit, whereby the adjusting reduces stray and air-scattered light.

20. The system of claim 19, wherein the servo is a beam steering and shaping module servo.

* * * * *

UNITED STATES PATENT AND TRADEMARK OFFICE
CERTIFICATE OF CORRECTION

PATENT NO. : 10,739,276 B2  
APPLICATION NO. : 15/828938  
DATED : August 11, 2020  
INVENTOR(S) : Pettibone et al.

Page 1 of 1

It is certified that error appears in the above-identified patent and that said Letters Patent is hereby corrected as shown below:

On the Title Page

Item (54), the Title should read:  
--(54) MINIMIZING FIELD SIZE TO REDUCE UNWANTED STRAY LIGHT--

In the Specification

Column 1, Lines 1-2 should read:  
--MINIMIZING FIELD SIZE TO REDUCE UNWANTED STRAY LIGHT--

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*